(12) United States Patent
Williams et al.

(10) Patent No.: US 7,807,057 B2
(45) Date of Patent: *Oct. 5, 2010

(54) DYNAMIC UP-FLOW ZEOLITE SYSTEM AND METHOD

(75) Inventors: Charles S. Williams, Golden, CO (US); Jody Kelso, Arvada, CO (US); David Jones, Arvada, CO (US)

(73) Assignee: WRT International LLC, Wheat Ridge, CO (US)

( * ) Notice: Subject to any disclaimer, the term of this patent is extended or adjusted under 35 U.S.C. 154(b) by 284 days.

This patent is subject to a terminal disclaimer.

(21) Appl. No.: 12/016,844

(22) Filed: Jan. 18, 2008

(65) Prior Publication Data

US 2008/0110832 A1    May 15, 2008

Related U.S. Application Data

(63) Continuation of application No. 10/978,086, filed on Oct. 28, 2004, now Pat. No. 7,326,347.

(60) Provisional application No. 60/515,921, filed on Oct. 29, 2003.

(51) Int. Cl.
*B01D 15/00* (2006.01)

(52) U.S. Cl. ...................... 210/661; 210/189

(58) Field of Classification Search ............... 210/189, 210/661; 585/820
See application file for complete search history.

(56) References Cited

U.S. PATENT DOCUMENTS

| | | | |
|---|---|---|---|
| 2,632,720 A | 3/1953 | Perry | |
| 3,700,592 A | 10/1972 | Pree | |
| 3,723,308 A | 3/1973 | Breck | |
| 3,933,631 A | 1/1976 | Adams | |
| 4,009,102 A | 2/1977 | Davis | |
| 4,265,634 A | 5/1981 | Pohl | |
| 4,375,568 A | 3/1983 | Izod et al. | |
| 4,389,293 A | 6/1983 | Mani et al. | |
| 4,445,443 A | 5/1984 | Stewart et al. | |
| 4,475,772 A | 10/1984 | Jan | |
| 4,686,198 A | 8/1987 | Bush et al. | |
| 4,695,387 A | 9/1987 | Berry et al. | |
| 4,765,779 A | 8/1988 | Organ | |
| 4,800,024 A | 1/1989 | Elfline | |
| 4,995,956 A | 2/1991 | Mani | |
| 5,043,072 A | 8/1991 | Hitotsuyanagi et al. | |
| 5,055,674 A | 10/1991 | Kotrappa | |

(Continued)

OTHER PUBLICATIONS

Abdo et al., "A new technique for removing hexavalent chromium from waste water and energy generation via galvanic reduction with scrap iron", Energy Conservation and Management, vol. 39, No. 9, pp. 943-951, Jul. 1998. (Abstract).

(Continued)

*Primary Examiner*—Chester T Barry
(74) *Attorney, Agent, or Firm*—Dorsey & Whitney LLP

(57) ABSTRACT

Systems and methods are provided for the removal of a contaminate from an aqueous medium using a zeolite-based sorption column. The systems and methods include an optimized relationship between the hydraulic loading, zeolite mesh size, distribution of zeolite mesh sizes and zeolite bed volume expansion to provide a highly effective sorption column that resists clogging while increases capacity.

20 Claims, 4 Drawing Sheets

BED EXPANSION DATA ON INDIVIDUALLY SIEVED SCREEN FRACTIONS

U.S. PATENT DOCUMENTS

| | | | |
|---|---|---|---|
| 5,084,184 | A | 1/1992 | Burns |
| 5,200,046 | A | 4/1993 | Chlanda et al. |
| 5,207,914 | A | 5/1993 | Lin |
| 5,250,187 | A | 10/1993 | Franks |
| 5,268,107 | A | 12/1993 | Hutchings et al. |
| 5,348,659 | A | 9/1994 | Kunz et al. |
| 5,512,178 | A | 4/1996 | Dempo |
| 5,556,545 | A | 9/1996 | Volchek et al. |
| 5,575,919 | A | 11/1996 | Santina |
| 5,591,346 | A | 1/1997 | Etzel et al. |
| 5,595,666 | A | 1/1997 | Kochen et al. |
| 5,651,883 | A | 7/1997 | Horwitz et al. |
| 5,679,256 | A | 10/1997 | Rose |
| 5,695,642 | A | 12/1997 | Greenleigh et al. |
| 5,707,514 | A | 1/1998 | Yamasaki et al. |
| 5,711,015 | A | 1/1998 | Tofe |
| 5,725,753 | A | 3/1998 | Harada et al. |
| 5,733,434 | A | 3/1998 | Harada et al. |
| 5,876,685 | A | 3/1999 | Krulik et al. |
| 5,951,874 | A | 9/1999 | Jangbarwala et al. |
| 6,042,731 | A | 3/2000 | Bonnin |
| 6,200,482 | B1 | 3/2001 | Winchester et al. |
| 6,531,063 | B1 | 3/2003 | Rose |
| 6,582,605 | B2 | 6/2003 | Krulik et al. |
| 6,583,081 | B2 | 6/2003 | Seff |
| 6,613,230 | B2 | 9/2003 | Krulik et al. |
| 6,663,781 | B1 | 12/2003 | Huling et al. |
| 6,753,186 | B2 | 6/2004 | Moskoff |
| 6,843,920 | B1 | 1/2005 | Darmawan |
| 6,849,187 | B2 | 2/2005 | Shaniuk |
| 7,105,087 | B2 | 9/2006 | Litz |
| 7,108,784 | B1 | 9/2006 | Williams et al. |
| 7,261,811 | B2 | 8/2007 | Nakhia et al. |
| 7,326,347 | B2 * | 2/2008 | Williams et al. ............ 210/661 |
| 7,326,348 | B2 | 2/2008 | Williams et al. |
| 7,332,073 | B2 | 2/2008 | Johnson |
| 7,371,326 | B2 | 5/2008 | Dale |
| 7,390,414 | B2 | 6/2008 | Williams |
| 7,520,987 | B1 | 4/2009 | Williams et al. |
| 2003/0132155 | A1 | 7/2003 | Litz et al. |
| 2004/0020870 | A1 | 2/2004 | Amburgey |
| 2007/0215552 | A1 | 9/2007 | Williams et al. |
| 2008/0128359 | A1 | 6/2008 | Litz et al. |
| 2009/0236289 | A1 | 9/2009 | Williams et al. |

OTHER PUBLICATIONS

Ames, L. L., "Zeolitic Removal of Ammonium Ions from Agricultural and Other Wastewaters", 13th Pacific Northwest Industrial Waste Conference, Washington State University, pp. 135-152, 1967.

Barrado et al., "Characterisation of solid residues obtained on removal of Cr from waste water", Journal of Alloys and Compounds, vol. 335, pp. 203-209, Mar. 14, 2002. (Abstract).

Bishop, D. F. et al., "Physical-Chemical Treatment of Municipal Wastewater", Journal of Water Pollution Control Federation, vol. 44, No. 3, pp. 361-371, 1972.

çelik, M. S. et al., "Removal of Ammonia by Natural Clay Minerals Using Fixed and Fluidised Bed Column Reactors", Water Science and Technology: Water Supply, vol. 1, No. 1, pp. 81-88, 2001.

Chmielewska-Horváthová, E., "Use of Clinoptiloite in Ammonia Removal from Wastewater in and Outside Slovakia", Mineralia Slovacava, vol. 27, No. 4, pp. 268-272, 1995.

Chmielewska-Horváthová, E., "Advanced Wastewater Treatment Using Clinoptiloite", Environment Protection Engineering, vol. 22, Issue 1-2, pp. 15-22, 1996.

Cooney, E. L. et al., "Ammonia Removal from Wastewaters Using Natural Australian Zeolite. II Pilot-Scale Study Using Continuous Packed Column Process", Separation Science and Technology, vol. 34, Issue 14, pp. 2741-2760, 1999.

Dowex RSC, "Radium Removal from Groundwater with Dowex RSC Radium Selective Complexer Resin", Dowex Ion Exchange Resins, http://www.dow.com/liquidseps, 2 pp., 2001.

Fazullina et al., "Removal of chromium compounds in the process of coagulation treatment of wool industry dyeing-finishing plant waste water", Soviet Journal of Water Chemistry and Technology, vol. 10, No. 5, pp. 85-88, 1988. (Abstract).

Hagiwara, Z. et al., "Ion-Exchange Reactions of Processed Zeolite and Its Application to the Removal of Ammonia-Nitrogen in Wastes", Natural Zeolites: Occurrence, Properties, Use, International Conference on the Occurrence, Properties, and Utilization of Natural Zeolites, Tucson, Arizona, Pergamon Press, pp. 463-470, 1978.

Han, Ihn Sup, "Environmental engineering parameters affecting the removal of hexavalent chromium and nitroaromatic compounds from water by granular activated carbon", Thesis, 178 pages, 1999. (Abstract).

Haralambous, A. et al., "The Use of Zeolite for Ammonium Uptake", Water Science and Technology Journal, vol. 25, No. 1, (1992), pp. 139-145.

Hayhurst, D. T., "The Potential Use of Natural Zeolites for Ammonia Removal During Coal-Gasification", Natural Zeolites: Occurrence, Properties, Use, International Conference on the Occurrence, Properties, and Utilization of Natural Zeolites, Tucson, Arizona, Pergamon Press, pp. 503-507, 1978.

Jørgensen, S.E., "Ammonia Removal by Use of Clinoptilolite", Water Research, vol. 10, pp. 213-224, 1976.

Kalló, D., "Wastewater Purification in Hungary Using Natural Zeolites", Natural Zeolites '93, International Committee Natural Zeolites, Brockport, New York, pp. 341-350, 1993.

Klieve, J. H. et al., "An Evaluation of Pretreated Natural Zeolites for Ammonium Removal", Water Research—The Journal of the International Association on Water Pollution Research, vol. 14, No. 2, Pergamon Press, pp. 161-168, 1980.

Koon, J. H. et al., "Optimization of Ammonia Removal by Ion Exchange Using Clinoptilolite", SERL, Report No. 71-5, University of California, Berkeley, California, pp. 1-189, 1971.

Koon, J. H. et al., "Ammonia Removal from Municipal Wastewaters by Ion Exchange", Journal Water Pollution Control Federation, vol. 47, No. 3, pp. 448-465, 1975.

Kosarek, Louis J., "Radionuclide removal from water," Environmental Science & Technology, vol. 13, No. 5, pp. 522-525 (1979).

Kutsy, V. G., "The Removal of Co; 2;+, Ni; 2;+, Cu; 2;+, Zn; 2;+, Mn; 2;+, Fe; 3;+ and Cr; 6;+ out of Water Solutions by Phosphates of Metals", Ekotekhnologii I Resursosberezhenie, Part 1, pp. 42-45, 2002. (Abstract).

Lin, et al., "The removal of hexavalent chromium from water by ferrous sulfate", Hazardous and insdustrial wastes: Proceedings of the twenty-seventh Mid-Atlantic industrial waste conference, Technomic Publishing Co., Inc., Lancaster, PA, 1995. (Abstract).

McLaren, J. R. et al., "Factors Affecting Ammonia Removal by Clinoptilolite", Journal of the Environmental Engineering Division, ASCE, vol. 1973, pp. 429-444, 1973.

Melitas et al., "Kinetics of soluble chromium removal from contaminated water by zero valent iron media: corrosion inhibition and passive oxide effects", Environmental Science Technology, vol. 35, No. 19, pp. 3948-3953, 2001. (Abstract).

Mercer, B. W., "Clinoptilolite in Water-Pollution Control", The Ore Bin, vol. 31 No. 11, pp. 209-213, 1969.

Mercer, B. W., "Ammonia Removal from Secondary Effluents by Selective Ion Exchange", Journal Water Pollution Control Federation, vol. 42, No. 2, pp. R95-R107, 1970.

Philipot et al., "Hexavalent Chromium Removal from Drinking Water", Water Science and Technology, vol. 17, No. 6/7, pp. 1121-1132, 1985. (Abstract).

Sarre et al., "Chromium removal in water by modified cellulose", Journal of Water Science, vol. 1, No. 1-2, pp. 55-71, 1988. (Abstract).

Semmens, M. J. et al., "Biological Regeneration of Ammonium-Saturated Clinoptilolite. II The Mechanism of Regeneration and Influence of Salt Concentration", Environmental Science & Technology, vol. 11, pp. 260-265, 1977.

Semmens, M. J. et al. "Nitrogen Removal by Ion Exchange: Biological Regeneration of Clinoptilolite", Journal of the Water Pollution Control Federation, vol. 49, No. 12, pp. 2431-2444, 1977.

Semmens, M. J. et al., "Clinoptilolite Column Ammonia Removal Model", Journal of the Environmental Engineering Division, Proceedings of the American Society of Civil Engineers, vol. 104, No. EE2, pp. 231-244, 1978.

Semmens, M. J. et al., "The Regeneration of Clinoptilolite by Biologically Restored Brine", University of Illinois, Water Resources Center, Research Report No. 139, pp. 1-1 through C-10, 1979.

Semmens, M. J. et al., "Ammonium Removal by Ion Exchange: Using Biologically Restored Regenerant", Journal of Water Pollution Control Federation, vol. 51, Issue 12, (Dec. 1979), pp. 2928-2940.

Semmens, M. J., "Ammonium Removal by Clinoptilolite Using Biologically Assisted Regeneration", 5th International Conference on Zeoliltes, Naples, Florida, pp. 795-804, 1980.

Slechta, A. F. et al., "Water Reclamation Studies at th South Lake Tahoe Public Utility District", Journal of the Water Pollution Control Federation, vol. 39, pp. 787-814, 1967.

Smith, S. A. et al., "Tahoe-Truckee Water Reclamation Plant. First Year Review", Water Reuse Symposium, vol. 2, pp. 1435-1445, 1979.

Svetich, Richard, "Long-Term Use of Clinoptilolite in the Treatment of Sewage at Tahoe-Truckee Sanitation Agency, Truckee, California", Natural Zeolites: Occurrence, Properties, Use, International Conference on the Occurrence, Properties, and Utilization of Natural Zeolites, Red Lion Hotel-Riverside, Boise, Idaho pp. 197-201, 1993.

Townsend, R. P. et al., "Ion Exchange Properties of Natural Clinoptilolite, Ferrierite and Mordenite: 1. Sodium-Ammonium Equilibria", Zeolites, vol. 4, No. 2, pp. 191-195, 1984.

\* cited by examiner

BED EXPANSION DATA ON INDIVIDUALLY SIEVED SCREEN FRACTIONS

BED EXPANSION DATA ON INDIVIDUALLY SIEVED SCREEN FRACTIONS

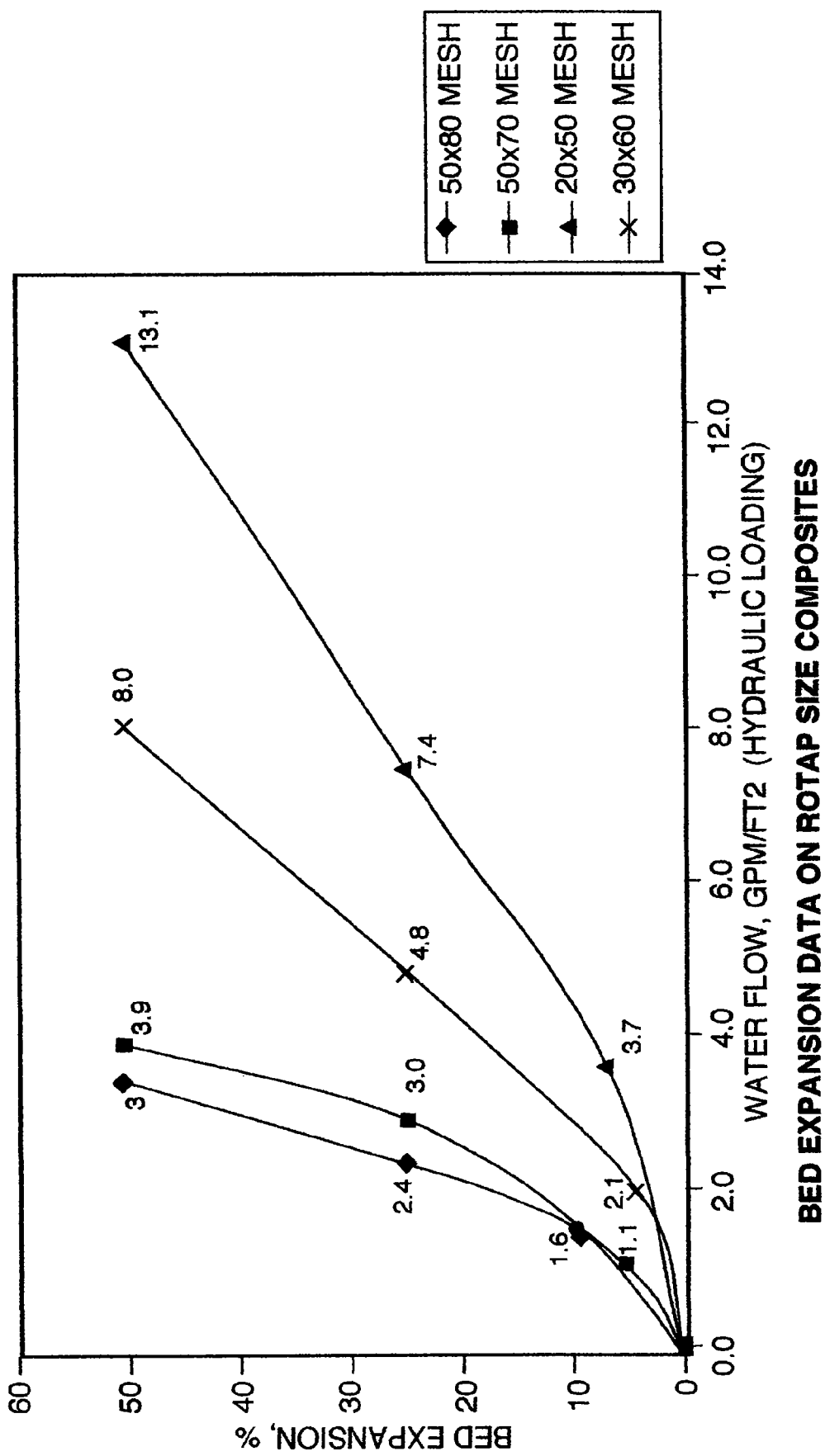

DYNAMIC UP-FLOW ZEOLITE SYSTEM AND METHOD

CROSS REFERENCE TO RELATED APPLICATIONS

This application is a continuation of U.S. patent application Ser. No. 10/978,086, entitled "Dynamic Up-Flow Zeolite System," filed on Oct. 28, 2004, now U.S. Pat. No. 7,326,347 which application claims the benefit under 35 U.S.C. §119(e) to U.S. Provisional Application No. 60/515,921, filed on Oct. 29, 2003, entitled "Dynamic Up-Flow Zeolite System," which are incorporated herein by reference in their entireties.

FIELD OF THE INVENTION

The invention generally relates to methods and systems for removal of target contaminates from an aqueous media source. More specifically, the invention provides systems and methods for enhancing the effectiveness of a zeolite-based sorption column, both in increasing the capacity of zeolite in the system, and in minimizing the clogging of trapped particulates within the zeolite in a column or system.

BACKGROUND OF THE INVENTION

Cities and towns throughout the world depend on having clean potable water supplies. The dependence on clean water has increased as the population of the world has increased, especially as industrial use of rivers and lakes have become commonplace. The increased industrial use of fresh water supplies has resulted in a corresponding decrease in water quality throughout the world, due principally to industrial related release of pollutants into the water supplies. The decrease in water quality is contravening to the world's increased dependence on clean potable water supplies, requiring a concerted effort toward both minimizing the release of pollution into the water supplies and removing existing pollution in water supplies throughout the world.

Conventionally, water treatment facilities are often equipped with specialized systems for removal of target pollutants from a water supply. For example, contacting the water supply with an affinity material having sorptive qualities toward the target pollutant of concern in the water source. Typically, these sorptive materials are constrained in a column that receives the water source, in a down-flow fashion, allowing the movement of the water source and gravity to compact the sorptive material through-which the water source will flow. Although these down-flow systems tend to beneficially act as filters, due to the compacted sorptive material, they also tend to clog and rarely provide adequate space between each sorptive material particle and the aqueous media source for maximal sorptive properties. These are a significant issue, i.e., system capacity and system clogging, when a large volume of water is being treated, for example at a municipal water treatment facility.

In more limited settings, water supplies have been passed through sorptive columns in an up-flow manner. However, clogging and inadequate movement of the water source over the sorptive material have proven problematic.

Against this backdrop the present invention was developed.

BRIEF SUMMARY OF THE INVENTION

The present invention provides systems, methods and compositions for the removal of target contaminates from an aqueous medium. Such systems, methods and compositions are based on the sorptive capacity of zeolite, including modified zeolite, for removal of contaminates like radium, arsenic, uranium and chromium from aqueous media sources.

Embodiments of the present invention provide methods and systems for optimizing the contact time of aqueous media with relatively high surface area zeolite. For example, embodiments of the invention include design of systems, and the systems, for correlating the optimal up-flow hydraulic loading of an aqueous medium into a column for a particular zeolite mesh size at a target contact time. Optimal results combine hydraulic loading, range of zeolite mesh sizes, expansion percentage of the particular zeolite under the hydraulic loading conditions, and resultant contact time of the aqueous media with the expanded zeolite. Optimal parameters are used to fabricate a highly effective zeolite based sorption column that combines both high capacity and low clogging due to the highly mixed and thereby scoured zeolite particles.

Embodiments of the present invention also provide systems for the removal of contaminates from an aqueous medium. Typically, systems of the present invention contain zeolite having a mesh size of from about 10×20 to about 40×70, under expansion conditions that result in zeolite bed expansion of from about 25% to about 50%. Systems of the invention optimize zeolite capacity while reducing or minimizing particulate clogging within the zeolite as compared to conventional down-flow or up-flow arrangements of the zeolite. In particular, embodiments of the present invention reduce iron and other like precipitation within and through the column, i.e., reduce the level of "red cloud" that occurs with respect to zeolite and modified zeolite.

These and various other features as well as advantages which characterize the invention will be apparent from a reading of the following detailed description and a review of the appended claims.

BRIEF DESCRIPTION OF THE DRAWINGS

FIG. 4 illustrates bed expansion for Rotap size composites under varying hydraulic loading parameters.

DETAILED DESCRIPTION OF THE INVENTION

Definitions

Figure 1:
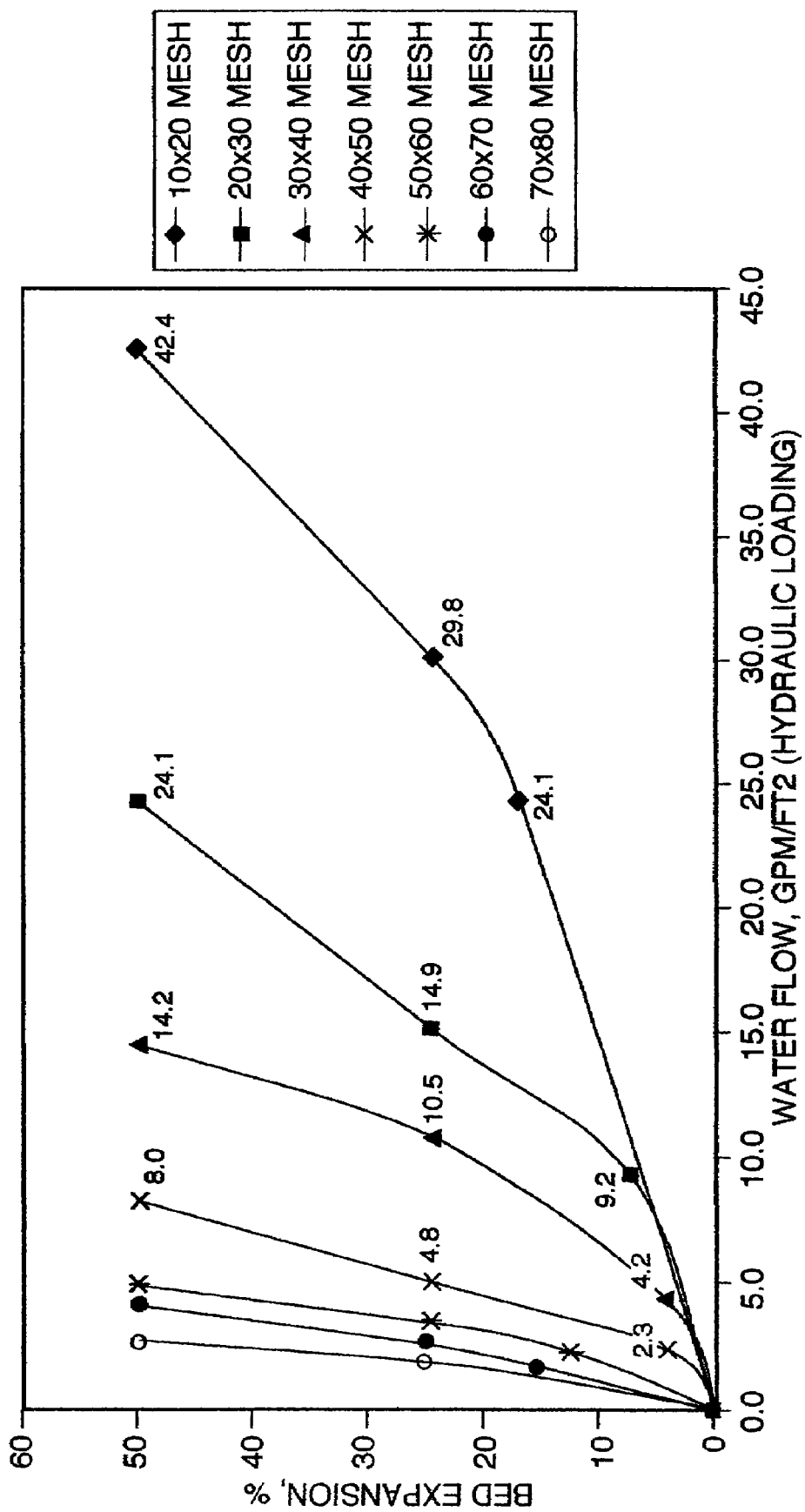
FIG. 1 illustrates bed expansion for individually "sieved screen" zeolite fractions under varying hydraulic loading parameters.

The following definitions are provided to facilitate understanding of certain terms used frequently herein and are not meant to limit the scope of the present disclosure.

"Aqueous medium" refers to water or any liquid made with water as a constituent. In some cases, aqueous medium or media comprises one or more contaminates. For example an aqueous medium containing $Cr^{6+}$, can be ground water supplies contaminated with $Cr^{6+}$ where the ground water supply is obtained from the water table adjacent and/or in the vicinity of an automobile manufacturing plant. In other cases, the contaminate in an aqueous medium is arsenic uranium, radium or other materials from any number of sources. Note that aqueous medium can include particulates, i.e., dirt, soil, precipitates, etc that lead to conventional filter clogging.

"Feed" refers to an aqueous medium before treatment with the systems, methods and/or compositions of the present invention, for example, a flowing water source before it enters a water treatment facility, or an underground water supply before it enters the systems of the present invention.

"Maximum Contaminant Level" or "MCL" is the highest level of contamination for a particular contaminate that is allowed in drinking water in the United States, taking into account best treatment technology and cost. These standards are typically enforceable. Note that Maximum Contaminant Level standards are envisioned to encompass or correspond to the same approximate standards in countries outside the United States, and in may cases are enforceable in those countries.

"Pollutant" or "contaminate" are used interchangeably and refer to a material within an aqueous medium having sorptive characteristics that are consistent with their removal by zeolite or a modified zeolite. Pollutants of the present invention include but are not limited to arsenic, radium, chromium and uranium. For example a modified zeolite, e.g., ferrous form zeolite, removes chromium from an aqueous medium.

"Precipitate" refers to material that can conventionally clog a filter or sorption-based device during flow of an aqueous medium through the filter or sorption-based device. Exemplary precipitates include iron precipitates (forming what has been termed a "red cloud" in a discharged aqueous medium), other chemical precipitates, and various sized particulates.

"Zeolite" refers to a natural and/or synthetic zeolite. Natural zeolites are hydrated silicate of aluminum and either sodium or calcium or both, for example clinoptilolite and chabazite. Synthetic zeolites are made by a number of well known processes, for example gel or clay processes, which form a matrix to which the zeolite is added. Example synthetic zeolites include Linde® AW-30 and Zeolon® 900. Note that a coarse zeolite has an average mesh size of about 12×40 or 10×40. Finer zeolite mesh sizes include, but are not limited to, 20×50, 40×70, and 50×80. Examples of particular zeolites for the removal of contaminates are disclosed within U.S. patent application Ser. Nos. 10/255,364, filed Sep. 25, 2002, 10/256,854, filed Sep. 26, 2002, and 10/256,853, filed Sep. 26, 2002 which are each herein incorporated in there entirety by reference.

"Remove" refers to the detectable decrease of a target material, for example $Cr^{6+}$ or other solutes or contaminates, from a source, for example ground water. Typically, removal of a target material from an aqueous source is at least 50%, preferably at least 75% and most preferably at least 90%, from the original levels (feed levels) in the zeolite treated source. Typically, the concentration of the solute or contaminate in the aqueous medium is changed from a first level to a second lower level using the embodiments of the present invention.

"Absorb" and "adsorb" refer to the same basic principle of one substance being retained by another substance. The processes can include attraction of one substance to the surface of another substance or the penetration of one substance into the inner structure of another substance. For example, the present invention contemplates that ferrous-form zeolite can either absorb and/or adsorb six-valent chromium out of an aqueous medium and that for purposes of the present invention, the two principles are interchangeable. Other terms used to describe this interaction include sorption, binding or trapping, each of which is contemplated to be within the definition of absorption and/or adsorption.

Embodiments of the present invention provide methods, systems and compositions for removal of target contaminates from an aqueous medium, for example, removal of arsenic from a source of ground water. In general, the methods, systems and compositions of the present invention rely upon zeolite or modified zeolite absorption columns, for example ferrous-form loaded zeolite columns. Embodiments of the present invention combine the sorptive characteristics of target zeolite with an unique up-flow, high retention time, system to maximize contact time between the aqueous medium and zeolite and to minimize or reduce potential for clogging of the zeolite during such contact time.

Aqueous Media Hydraulic Loading, Zeolite Mesh Size, and Bed Expansion:

The present invention provides zeolite-based adsorption and/or absorption columns (or other zeolite constraining device) for optimized hydraulic loading of an aqueous media, for a target zeolite mesh size that results in optimal zeolite expansion and aqueous media/zeolite contact time. Zeolite and modified zeolite containing columns provide well-mixed zeolite having fewer contaminates within the zeolite, for example surface iron, to react with and form "red cloud" type precipitates for example.

With regard to the zeolite used in embodiments of the present invention, either natural or synthetic zeolilte can be used. Compositionally, zeolites are similar to clay minerals, where zeolites are natural hydrated silicate of aluminum and either sodium, calcium or a mixture of both. However, unlike clays, which have a layered crystalline structure (similar to a deck of cards that is subject to shrinking and swelling as water is absorbed), zeolites have a rigid three-dimensional crystalline structure, for example a honeycomb-like crystalline structure. Zeolites' rigid honeycomb-like structure consists of a network of interconnected tunnels and cages, thereby forming a series of substantially uniformly sized pores. Aqueous media moves freely in and out of the pores formed by the crystalline structure, making zeolite an excellent sieving or filtration type material, as well as providing a large surface area for interacting with target pollutants.

There are a number of natural zeolites useful in the context of the present invention, including, clinoptilolite, chabazite, phillipsite, mordenite, analcite, heulandite, stilbite, thomosonite, brewsterite, wellsite, harmotome, leonhardite, eschellite, erionite, epidesmine, and the like. The natural zeolites of the present invention differ in density, cation selectivity, molecular pore size, and cation affinity. For example, clinoptilolite has 16% more void volume and pores, and is as much as 0.2 mm larger in average diameter than analcime, another common zeolite. Clinoptilolite is a preferred natural zeolite useful in the generation of ferrous-form zeolite. In addition, natural zeolites that have been modified to have particle sizes from 10×20 mesh, 20×30 mesh, 30×40 mesh, 50×60 mesh, 60×70 mesh, 70×80 mesh, and preferably 40×70 mesh, and most preferably 50×80 mesh, are most useful in the present invention. Zeolite "fines" (powder) are typically removed before use in the present invention to prevent plugging in the tanks of the present invention.

Tables 1 and 2 provide a list of companies that presently produce zeolite minerals in either the United States or Canada. Table 1 provides a chemical analysis of the companies' zeolite materials, and Table 2 provides the physical properties of the corresponding zeolite materials. Tables 1 and 2 are provided as illustrative of the type of zeolite material that can be used for large scale use in practicing the present invention.

TABLE 1

Chemical Analysis (Expressed in Weight %)

| Company | Location | Na₂O | K₂O | CaO | MgO | SiO₂ | Al₂O₃ | TiO₂ | Fe₂O₃ |
|---|---|---|---|---|---|---|---|---|---|
| Addwest Minerals | WY | 4.7 | 1.9 | 1.6 | 0.65 | 74.0 | 14.0 | 0.1 | 2.1 |
| American Research | NV/CA | 3.5 | 3.8 | 0.7 | 0.4 | 69.1 | 11.9 | — | 0.74 |
| Am. Absorbents | OR | 0.8 | 3.8 | 0.7 | 0.4 | 69.1 | 11.9 | 0.2 | 0.7 |
| Stellhead Res. | CA/NM/OR | 0.8 | 3.8 | 0.7 | 0.4 | 69.1 | 11.9 | 0.2 | 0.4 |
| Teague Minerals | OR | 0.9 | 4.7 | 1.4 | 0.3 | 64.1 | 11.8 | 0.3 | 2.58 |
| Zeotech | TX | 0.6 | 1.7 | 2.4 | 0.7 | 68.4 | 12.1 | NK | NK |
| St. Cloud Mining | NM | 0.9 | 3.3 | 3.3 | 1.0 | 64.7 | 12.6 | 0.2 | 1.8 |
| W-Way Zeolites | Canada | 2.5 | 2.7 | 3.4 | 1.3 | 65.8 | 14.3 | 0.3 | 2.6 |
| Highwood Res | Canada | 2.78 | 2.79 | 3.78 | 0.95 | 64.5 | 13.7 | 0.27 | 2.19 |
| C2C Mining | Canada | 1.35 | 1.57 | 2.51 | 1.55 | 66.8 | 11.2 | 0.6 | 5.2 |

TABLE 2

Physical Properties

| Company | Ionic Exch Capacity (meq/g) | H₂O % Adsorption | Free Silica (%) | SG | Color | pH (natural) | Pore Diameter (Å) | Hardness |
|---|---|---|---|---|---|---|---|---|
| Addwest Minerals | 2.00 | 14.0 | 2.00 | 1.5 | pale blue | | 4.4 | 3.7 |
| American Research | 1.85 | 12.3 | NK | NK | | | 4.0 | 5.1 |
| Am. Absorbents | 1.4 | | 1.50 | 2.3 | white | 8.0 | 4.0 | 3.8 |
| Stellhead Res. | 1.30 | | 0.09 | 1.6 | white | 8.0 | 4.0 | 5.1 |
| Teague Minerals | 1.77 | | low | 2.2 | off white | | not provided | not provided |
| Zeotech | | | | | | | | |
| St. Cloud Mining | 1.60 | | 0.01< | 2.3 | white | 8.0 | 4.0 | 3.8 |
| W-Way Zeolites | 1.00 | 25.0 | NK | 2.4 | off white/pale green | 8.1 | 6.5 | NK |
| Highwood Res | 1.00 | | 10.0 | 2.0 | | 7.0 | | |
| C2C Mining | NK | NK | 5.00 | 2.3 | brown | 5.0? | NK | NK |

Synthetic zeolites can also be used in the context of the present invention. Synthetic zeolites are made by well known processes, such as gel process (sodium silicate and alumina) or clay processes (kaolin), which form a matrix to which the zeolite is added. Preferable synthetic zeolites include Linde®AW-30, Linde®AW-500, Linde®4-A and Zeolon®900.

The systems and methods of the present invention can utilize either natural, synthetic or mixtures of natural and synthetic zeolite.

As discussed more fully below, finer mesh sizes of zeolite are preferable to coarser mesh sizes of zeolite within the context of the present invention, because finer zeolite mesh sizes facilitate proper bed expansion at lower hydraulic loading rates. Lower hydraulic loading rates facilitate maximal contact times of the aqueous media with the zeolite, thereby maximizing the sorptive capacity of the zeolite. In addition, utilizing narrower size ranges of fine zeolite, as compared to broader, less-defined, ranges of zeolite, allows for the majority of the zeolite material to act consistently/predictably under hydraulic loading conditions for a particular column. Enhanced consistency and predictability facilitates design and efficiency of systems of the present invention. Further, optimized parameters of the present invention provide well-mixed zeolite material thereby reducing or eliminating trapped precipitates within the zeolite material and on the surfaces of the zeolite materials, for example, reduces the amount of red cloud formed from iron on the surface of the media.

In preferred embodiments, zeolite mesh sizes and ranges are provided that allow for hydraulic loading between 3-25 gallons per minute gpm/ft², and more preferably in the 4-15 gpm/ft², and most preferably in the 4-6 gpm/ft², that result in bed expansion of from about 25% to about 75% (from the settled volume to the zeolite volume under hydraulic loading), and preferably from about 25% to about 50%. Adequate column diameters are determined from the required capacity of the zeolite material, the hydraulic loading, the predicted expansion percentage, and the like. Note that in some instances the percent increase in bed expansion can be greater than 50%-75% as long as enough zeolite remains in the column to provide the capacity for removing target contaminates from the aqueous medium.

Figure 2:
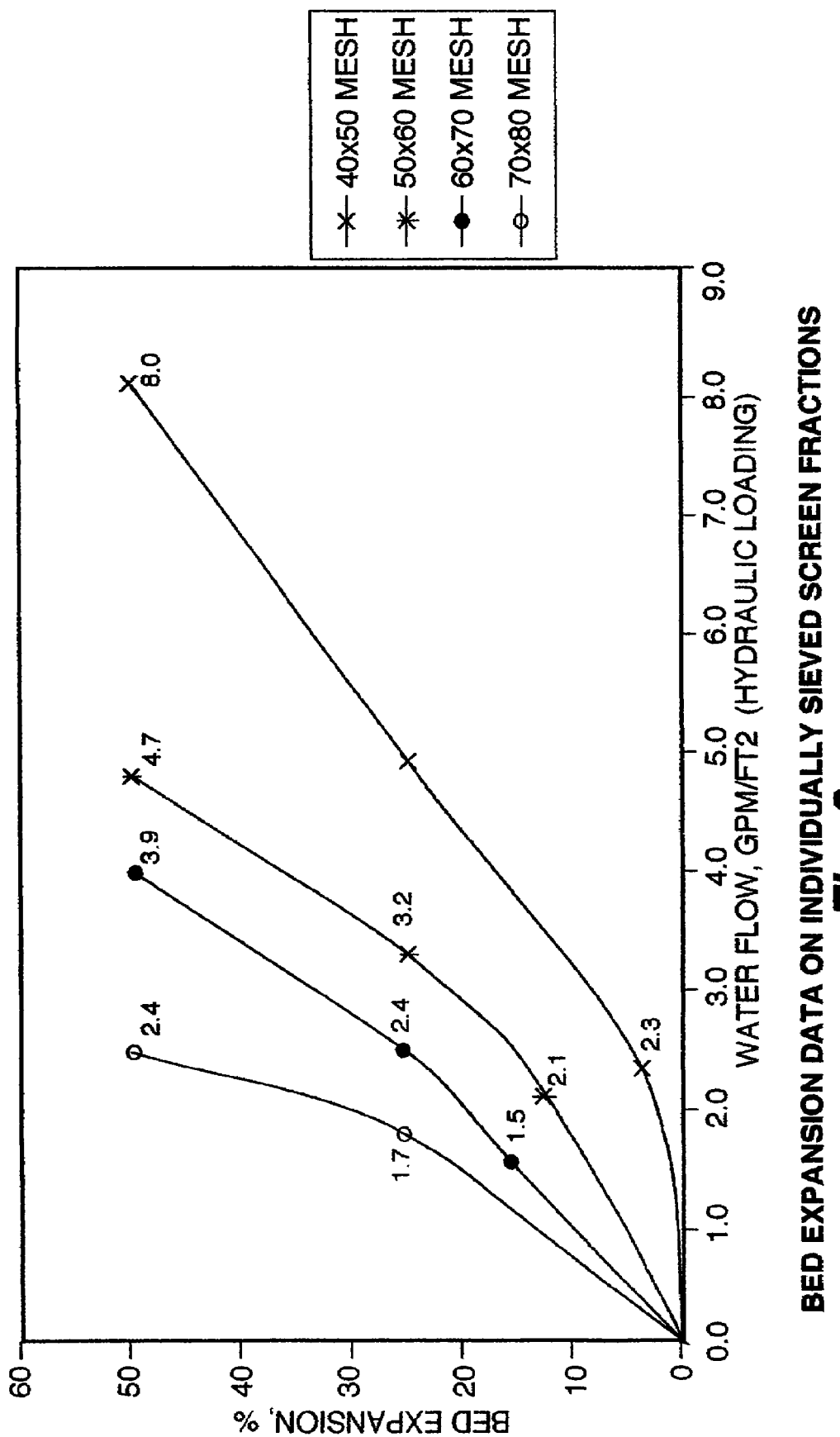
FIG. 2 illustrates bed expansion for individually "sieved screen" zeolite fractions under varying hydraulic loading parameters.

In more detail, experiments were performed to optimize hydraulic loading of an aqueous medium for a target zeolite mesh size that then provides preferred expansion percentage for that target zeolite mesh size. Target zeolite bed expansion is generally between 25% to 50%, as is correlated from the field of affinity chromatography and other like arts. Note that this range is preferred, although smaller percent bed expansion and larger percent bed expansion can be used dependent on the end-use and efficiency that the end-user is needing. FIGS. 1 and 2 illustrate that a finer mesh size, for example 60×70, meets the bed expansion and hydraulic loading criteria for optimized pollutant removal from an aqueous medium, i.e., provides adequate contact time for the aqueous medium on the zeolite or modified zeolite. Both FIGS. 1 and 2 show the bed expansions as a function of hydraulic loading for a number of different zeolite mesh sizes (note that coarsest size fractions are not included in FIG. 2 to enhance the definition of the finer fractions). The graphs show that preferred bed expansion (25% to 50%) is achieved for finer mesh sizes utilizing lower hydraulic loading, thereby allowing for longer retention times of the media on the zeolite. Note that the data graphed in FIGS. 1 and 2 can be used to design a column having any number of different zeolite mesh sizes as long as the appropriate hydraulic loading parameters are followed. Therefore, FIGS. 1 and 2 provide a relationship for determining how to maximize contact time of a medium on a particular zeolite mesh size and thereby maximize the removal capacity for that zeolite mesh size.

Figure 3:
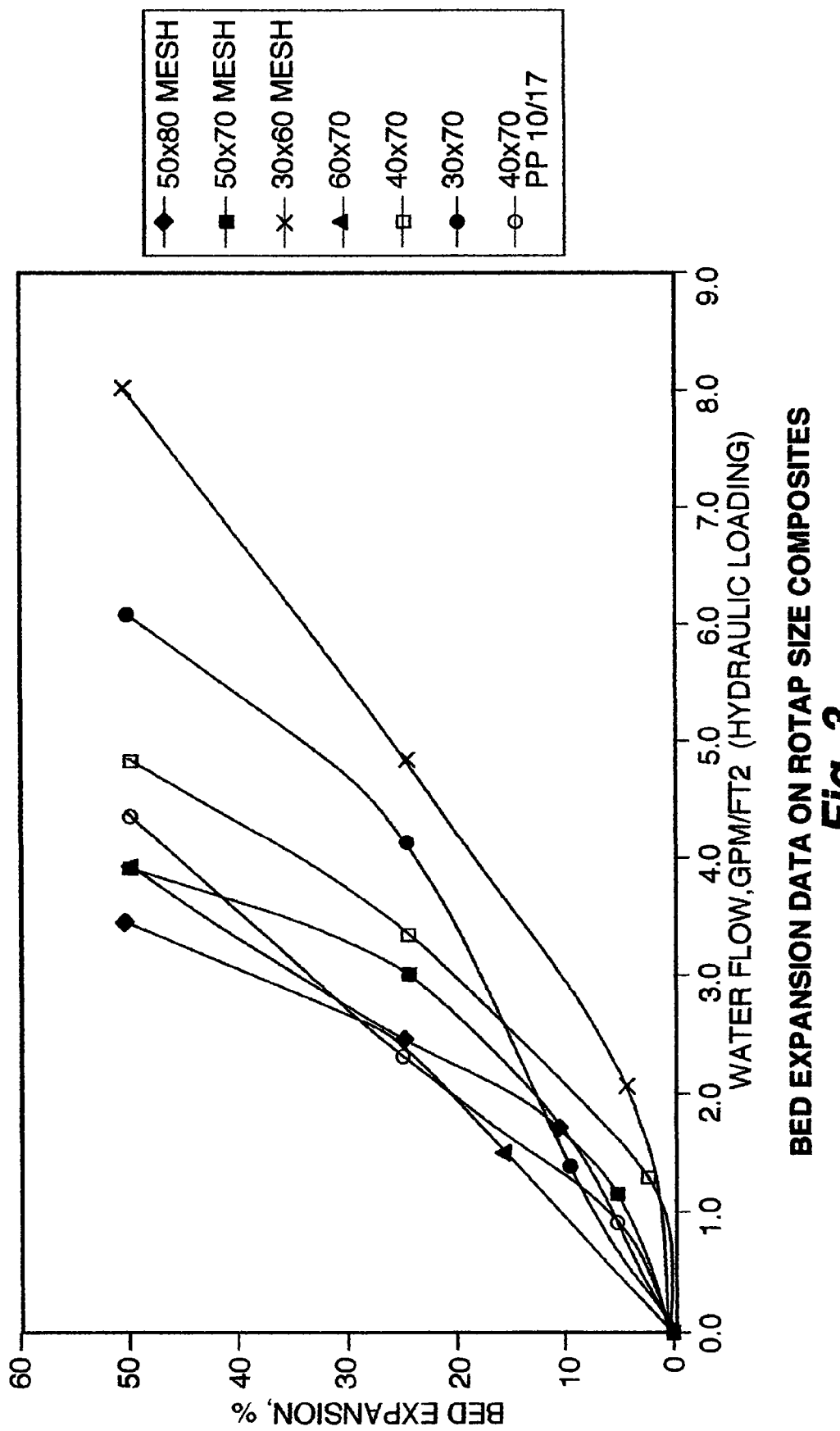
FIG. 3 illustrates bed expansion for Rotap size zeolite composites under varying hydraulic loading parameters.

Referring to FIGS. 3 and 4, composite zeolite materials were similarly tested to determine preferred hydraulic loading rates for particular zeolite composites that result in bed expansion. Note that composite materials were prepared by mixing equal weights of each included fraction, for example a 50×80 composite mesh includes 33% 50×60, 33% 60×70 and 33% 70×80. In particular, the 50×70 mesh composite showed identical flow at 50% expansion, as did the 60×70 fraction although the curve profile is more curved. Composites with 50 and 60 mesh at the bottom size did not meet the fluidization criteria and required too much water.

Finally, increasing the expansion of a finer zeolite media, for example by 40%, ensures that at least 40% of the material is fluidized and that the remaining zeolite is dynamically moving, i.e., mixing against the other settled material in preparation to being fluidized itself, not sitting stagnant. This dynamic movement of zeolite ensures that few pockets of stagnant aqueous media or zeolite is present in the column thereby reducing clogging and formation of precipitates on the surface of the zeolite. In addition, dynamic movement of zeolite facilitates the uniform interaction of zeolite with contaminates within the aqueous media.

Note also that although the preceding disclosure is directed toward removal of a solute or contaminate from an aqueous medium that is generally considered detrimental, for example arsenic or chromium, to the aqueous medium, other embodiments of the present invention also include removal and isolation of potentially useful solutes from an aqueous medium, for example, metal extractions from a mine. Increased contact between the zeolite and useful solute, and thereby increased removal of useful solute from an aqueous medium, makes that removal process that much more profitable.

Systems and Methods for Removal of Pollutants from Aqueous Medium

As discussed above (see FIGS. 1-4), a correlation between hydraulic loading rates, zeolite size, ranges of zeolite sizes, and retention times has been developed for designing a system and method for the removal of contaminates from an aqueous media. In a first step, a target hydraulic loading rate is determined for a particular aqueous media source. For example, a source having a high level of a particular pollutant (for example arsenic) might require a lower hydraulic loading rate, i.e., in the 4-6 gpm/ft$^2$ range, to maximize the retention time of the aqueous media and the zeolite, or a particular source or site may require a particular dynamic loading due to parameters beyond the system designers control. Using the relationships shown in FIGS. 1-4, an appropriate mesh size is determined for the particular hydraulic loading rate that would allow for about 25% to about 50% bed expansion during the course of the run (entire contact time of the aqueous media and zeolite within the column). For example, 50×60 mesh would provide 30% bed expansion under 4 gpm/ft$^2$ hydraulic loading. Finally, a determination is made as to how wide a distribution of zeolite mesh sizes can be included in the target column to allow for the proper functioning of the column (this also helps minimize expense by loosening the size distribution of the resultant zeolite). Note also that a narrow range of mesh sizes allows for lower hydraulic loading rates because the majority of the material should expand under the predictable force (as compared to a fine zeolite that includes coarse material, these will struggle to expand under a predictable fashion under the same hydraulic loading conditions).

One embodiment of a system for removing a contaminate from an aqueous medium using the methods and compositions of the present invention includes having an aqueous medium feed with a first level of contaminate, e.g., $Cr^{6+}$ in a ground or surface water source. The system may include a contaminate detection device or sampling device for determining the first concentration of one or more solutes in the aqueous media feed. A storage tank can optionally be present to store aqueous medium prior to treatment with the methods and systems of the present invention. The storage tank can include a float to sense the content within the storage tank. The aqueous media is fed from the supply or storage tank into a column feed pump or other like device to pull the medium from the storage tank and feed it into a sorption column in an upflow fashion. Up-flow parameters, i.e., hydraulic loading, zeolite size and distribution, column diameters, and the like are determined as above (see FIGS. 1-4). Aqueous media flow through the column creates a 25 to 50% zeolite bed expansion as anticipated by the relationship discussed above.

Note that filters can be incorporated within the system to facilitate the removal of particulates from the media, including filters between the pump and sorption column and at the top end of the sorption column to minimize the amount of zeolite that escapes each column run during bed expansion. It is also noted that the sorption column can be connected to a number of sorption columns in the system. Each column composition dependent on the hydraulic loading, zeolite mesh size and distribution, and bed expansion as discussed above. It should be noted that the columns can be connected in series or in parallel, dependent on column pressures and flows. A second contaminate detection device can be on the discharge side of the columns to measure the concentration of one or more solutes or contaminates in the eluant, referred to as a second solute or contaminate concentration level.

Note that the systems of the present invention are generally designed to be incorporated into conventional water treatment systems, and preferably are designed to be incorporated into theses systems as stand-alone units. Typically, the incorporation of the systems and methods of the present invention do not require that the existing system be re-designed, but rather, that the removal systems and methods be adapted to function before, during or after more conventional water treatment. Preferably, embodiments of the removal systems and methods of the present invention are added to existing water treatment facilities as a first treatment step. Preferably, embodiments of the present invention remove an amount of pollutant from a water source to meet the current MCL for that pollutant in the United States by the EPA. Note also that the systems of the present invention are portable and can be designed for transport in trucks or other movable platforms to contaminated sites, for example to a well located in a high $Cr^{6+}$ contaminated ground water area.

The systems and methods of the present invention are adapted for use with existing water treatment plants as a "turn-key" or "bolt-on" process to remove pollutants from aqueous media. These facilities can be used to improve the quality of aqueous media in a number of applications, including drinking water, waste water, agricultural water and ground water. In the same manner, the systems and methods of the present invention can be incorporated into new water treatment plant designs, again as "turn-key" or "bolt-on" process to the conventional water treatment facility, or integrated into the facility as designed by one of skill in the art.

Of particular importance, zeolite-based removal systems of the present invention facilitate movement of precipitates (chemical or otherwise) through the zeolite, and typically avoid clogging within the zeolite (due to the bed expansion for each zeolite mesh size and mixing of zeolite against itself). Further, since the zeolite is typically finer and in a dynamic state within the column, it tends to be scoured by other zeolite particles within the column and thereby less likely to harbor contaminants upon its own surface, as the contaminants are often mechanically broken off the zeolite surface.

Having generally described the invention, the same will be more readily understood by reference to the following examples, which are provided by way of illustration and are not intended as limiting.

EXAMPLES

Example I

Zeolite Bed Expansion Under Varying Hydraulic Loading Parameters

Approximately ten pounds of Zeolite, mesh sizes 10×20, 20×30, 30×40, 50×60, 60×70 and 70×80, was dry screened (Rotaps). Each fraction was soaked for 12 to 16 hours in water to allow complete water absorption. Fluidization test were conducted in a 4 inch diameter column of WRT design which includes one bubble cap assembly. The cap was shaved so that the gap around the circumference was even and would not enhance preferential flow, channeling up the column.

The effect of the gap was investigated using the 10×20 mesh zeolite. Gap widths between 0.187 and 0.257 inches were tested and the flow pattern was observed for each. For this size fraction, the gap seemed to make little or no difference within the limits tested. The flow from under the cap channeled in only one location regardless of the gap. The water channel location was stationary and rose to a height of about 16 to 18 inches before a general diffusion was seen. At the column base zeolite was moving upward in the high-velocity channel and downward for the remainder of the area.

For the <20 mesh fractions, high velocity channeling was still observed but the flow moved at random around the bubble cap. Cap gaps and the calculated average flow from under the cap were included on the data sheets for this series. The gaps were narrowed for the finer size fractions.

Referring to FIGS. 1 and 2, bed expansions as a function of flow rate per foot squared is shown. The coarsest size fractions are not included in FIG. 2 to enhance definition of the finer fractions. The 60×70 mesh fraction most closely met the criteria for 50% bed expansion at 4 gpm/ft2. Note that the 70×80 mesh may have been to fine under the conditions of this example. For each test three points were recorded: 1) the minimum flow for general bed movement, 2) the flow for 25% bed expansion, and 3) the flow for 50% bed expansion. Zero bed expansion was measured by natural settling of the zeolite after a brief elutriation of the column.

Tables 3-9 provide specific numerical readings for the data shown in FIGS. 1 and 2. Note the minimum flow rate to obtain 25% bed expansion is shown in the tables.

TABLE 3

Fluidization Test For 10 × 20 mesh, rotapped

| Bed Height | | Flow Rate | | Cap Gap | Average Flow Velocity Under Cap |
|---|---|---|---|---|---|
| (inches) | Expansion % | GPM | GPM/ft² | (inches) | ft/sec |
| 24.5 | 0 | 0 | 0 | 0 | 0 |
| 28.75 | 17.3 | 2.1 | 24.1 | 0.257 | 3.7 (min flow) |
| 30.6 | 24.9 | 2.6 | 29.8 | 0.257 | 4.5 |
| 36.75 | 50 | 3.7 | 42.4 | 0.257 | 6.5 |

Column Diameter - 4 in;
column area - 0.0874 ft²;
Water disperser - Water Remediation Technology bubble cap, even gap.
Column was maintained in a true vertical position and the water was dispersed through a bubble cap with even gap around circumference. Given the coarse sample, the water channeled to one area of the column. Experimentation with the bubble cap width showed little difference in results (gaps were tried between 0.187 and 0.257 inches).

TABLE 4

Fluidization Test For 20 × 30 mesh, rotapped

| Bed Height | | Flow Rate | | Cap Gap | Average Flow Velocity Under Cap |
|---|---|---|---|---|---|
| (inches) | Expansion % | GPM | GPM/ft² | (inches) | ft/sec |
| 27.25 | 0 | 0 | 0 | 0.257 | |
| 29.25 | 7.3 | 0.8 | 9.2 | 0.257 | 1.4 (min flow) |
| 34.1 | 25.1 | 1.3 | 14.9 | 0.257 | 2.3 |
| 40.9 | 50.1 | 2.1 | 24.1 | 0.257 | 3.7 |

Column Diameter - 4 in;
column area - 0.0873 ft²;
Water disperser - Water Remediation Technology bubble cap, even gap.
Column was maintained in a true vertical position and the water was dispersed through a bubble cap with even gap around circumference. The water flow around the bubble cap appeared more random and the upflow channeling at the base of the zeolite bed moved at random.

TABLE 5

Fluidization Test For 30 × 40 mesh, rotapped

| Bed Height | | Flow Rate | | Cap Gap | Average Flow Velocity Under Cap |
|---|---|---|---|---|---|
| (inches) | Expansion % | GPM | GPM/ft² | (inches) | ft/sec |
| 27 | 0 | 0 | 0 | 0.189 | 0 |
| 28.12 | 4.1 | 0.37 | 4.2 | 0.189 | 0.88 |
| 33.75 | 25 | 0.92 | 10.5 | 0.189 | 2.2 |
| 40.5 | 50 | 1.24 | 14.2 | 0.189 | 2.9 |

Column Diameter - 4 in;
column area - 0.0873 ft²;
Water disperser - Water Remediation Technology bubble cap, even gap.
Column was maintained in a true vertical position and the water was dispersed through a bubble cap with even gap around circumference. The water flow around the bubble cap appeared more random and the upflow channeling at the base of the zeolite bed moved at random.

TABLE 6

Fluidization Test For 40 × 50 mesh, rotapped

| Bed Height | | Flow Rate | | Cap Gap | Average Flow Velocity Under Cap |
|---|---|---|---|---|---|
| (inches) | Expansion % | GPM | GPM/ft² | (inches) | ft/sec |
| 30.75 | 0 | 0 | 0 | 0.189 | 0 |
| 32 | 4.1 | 0.2 | 2.3 | 0.189 | 0.47 (min flow) |
| 38.4 | 24.9 | 0.42 | 4.8 | 0.189 | 0.99 |
| 46.1 | 49.9 | 0.7 | 8 | 0.189 | 1.66 |

Column Diameter - 4 in;
column area - 0.0873 ft²;
Water disperser - Water Remediation Technology bubble cap, even gap.
Column was maintained in a true vertical position and the water was dispersed through a bubble cap with even gap around circumference. The water flow around the bubble cap appeared more random and the upflow channeling at the base of the zeolite bed moved at random.

TABLE 7

Fluidization Test For 50 × 60 mesh, rotapped

| Bed Height | | Flow Rate | | Cap Gap | Average Flow Velocity Under Cap |
|---|---|---|---|---|---|
| (inches) | Expansion % | GPM | GPM/ft² | (inches) | ft/sec |
| 32 | 0 | 0 | 0 | 0.075 | 0 |
| 36 | 12.5 | 0.18 | 2.1 | 0.075 | 1.08 (min flow) |
| 40 | 25 | 0.28 | 3.2 | 0.075 | 1.2 |
| 48 | 50 | 0.41 | 4.7 | 0.075 | 2.45 |

Column Diameter - 4 in;
column area - 0.0873 ft²;
Water disperser - Water Remediation Technology bubble cap, even gap.
Column was maintained in a true vertical position and the water was dispersed through a bubble cap with even gap around circumference. The water flow around the bubble cap appeared more random and the upflow channeling at the base of the zeolite bed moved at random.

TABLE 8

Fluidization Test For 60 × 70 mesh, rotapped

| Bed Height | | Flow Rate | | Cap Gap | Average Flow Velocity Under Cap |
|---|---|---|---|---|---|
| (inches) | Expansion % | GPM | GPM/ft² | (inches) | ft/sec |
| 22.5 | 0 | 0 | 0 | 0.075 | 0 |
| 26 | 15.6 | 0.13 | 1.5 | 0.075 | 0.78 (min flow) |
| 28.25 | 25.6 | 0.21 | 2.4 | 0.075 | 1.61 |
| 33.75 | 50 | 0.34 | 3.9 | 0.075 | 2.03 |

Column Diameter - 4 in;
column area - 0.0873 ft²;
Water disperser - Water Remediation Technology bubble cap, even gap.
Column was maintained in a true vertical position and the water was dispersed through a bubble cap with even gap around circumference. The water flow around the bubble cap appeared more random and the upflow channeling at the base of the zeolite bed moved at random.

TABLE 9

Fluidization Test For 70 × 80 mesh, rotapped

| Bed Height | | Flow Rate | | Cap Gap | Average Flow Velocity Under Cap |
|---|---|---|---|---|---|
| (inches) | Expansion % | GPM | GPM/ft² | (inches) | ft/sec |
| 22.5 | 0 | 0 | 0 | 0.075 | 0 |
| 28.25 | 25.6 | 0.15 | 1.7 | 0.075 | 0.90 (min flow) |
| 33.75 | 50 | 0.21 | 2.4 | 0.075 | 1.26 |

Column Diameter - 4 in;
column area - 0.0873 ft²;
Water disperser - Water Remediation Technology bubble cap, even gap.
Column was maintained in a true vertical position and water was dispersed through bubble cap with even gap around circumference. The water flow around the bubble cap appeared more random and the upflow channeling at the base of the zeolite bed moved at random. Minimum flow was at 25% expansion.

Several zeolite composites were assembled to establish fluidization curves for each: 50×80 (equal weights of included fractions), 50×70 (equal weights of included fractions), 20×50 (equal weights of included fractions), 30×60 (equal weights of included fractions), 40×70 (equal weights of included fractions), and 30×70 (equal weights of included fractions). FIGS. 3 and 4 display the fluidization curves for each composite. The 50×70 mesh composite showed the identical flow at 50% expansion as did the 60×70 mesh fraction although the curve profile is more curved. Tables 10-16 provide specific numerical readings for the data shown in FIGS. 3 and 4. Note the minimum flow rate to obtain 25% bed expansion.

TABLE 10

Fluidization Test For 50 × 80 mesh, comp. from Rotab Fractions

| Bed Height | | Flow Rate | | Cap Gap | Average Flow Velocity Under Cap |
|---|---|---|---|---|---|
| (inches) | Expansion % | GPM | GPM/ft² | (Inches) | ft/sec |
| 26.25 | 0 | 0 | 0 | 0.075 | 0 |
| 28.75 | 9.5 | 0.14 | 1.6 | 0.075 | 0.84 (min flow) |
| 32.75 | 24.8 | 0.21 | 2.4 | 0.075 | 1.26 |

TABLE 10-continued

Fluidization Test For 50 × 80 mesh, comp. from Rotab Fractions

| Bed Height (inches) | Expansion % | Flow Rate GPM | Flow Rate GPM/ft² | Cap Gap (Inches) | Average Flow Velocity Under Cap ft/sec |
|---|---|---|---|---|---|
| 39.5 | 50.5 | 0.3 | 3.4 | 0.075 | 1.79 |

Column Diameter - 4 in;

column area - 0.0873 ft²;

Water disperser - Water Remediation Technology bubble cap, even gap.

Colunn was maintained in a true vertical position and the water dispersed through bubble cap with even gap around the circumference. The water flow around the bubble cap appeared more random and the upflow channeling at the base of the zeolite bed moved at random. Minimum flow was at 25% expansion.

TABLE 11

Fluidization Test For 50 × 70 mesh, comp. from Rotab Fractions

| Bed Height (inches) | Expansion % | Flow Rate GPM | Flow Rate GPM/ft² | Cap Gap (Inches) | Average Flow Velocity Under Cap ft/sec |
|---|---|---|---|---|---|
| 26.125 | 0 | 0 | 0 | 0.075 | 0 |
| 27.6 | 5.3 | 0.1 | 1.1 | 0.075 | 0.6 (min flow) |
| 32.5 | 24.4 | 0.26 | 3 | 0.075 | 1.55 |
| 39.25 | 50.2 | 0.34 | 3.9 | 0.075 | 2.03 |

Column Diameter - 4 in;

column area - 0.0873 ft²;

Water disperser - Water Remediation Technology bubble cap, even gap.

Column was maintained in a true vertical position and the water was dispersed through bubble cap with even gap around the circumference. The water flow around the bubble cap appeared more random and the upflow channeling at the base of the zeolite bed moved at random. Minimum flow was at 25% expansion.

TABLE 12

Fluidization Test For 20 × 50 mesh, comp. from Rotab Fractions

| Bed Height (inches) | Expansion % | Flow Rate GPM | Flow Rate GPM/ft² | Cap Gap (Inches) | Average Flow Velocity Under Cap ft/sec |
|---|---|---|---|---|---|
| 23.5 | 0 | 0 | 0 | 0.125 | 0 |
| 25.125 | 6 | 0.32 | 3.7 | 0.125 | 1.15 (min flow) |
| 29.25 | 24.5 | 0.65 | 7.4 | 0.125 | 2.34 |
| 35.25 | 50 | 1.14 | 13.1 | 0.125 | 4.11 |

Column Diameter - 4 in;

column area - 0.0873 ft²;

Water disperser - Water Remediation Technology bubble cap, even gap.

Column maintained in a true vertical position and water dispersed through the bubble cap with even gap around the circumference. The water flow around the bubble cap appeared more random and the upflow channeling at the base of the zeolite bed moved at random. Minimum flow was at 25% expansion.

TABLE 13

Fluidization Test For 30 × 60 mesh, comp. from Rotab Fractions

| Bed Height (inches) | Expansion % | Flow Rate GPM | Flow Rate GPM/ft² | Cap Gap (Inches) | Average Flow Velocity Under Cap ft/sec |
|---|---|---|---|---|---|
| 24.5 | 0 | 0 | 0 | 0.125 | 0 |
| 25.5 | 4.1 | 0.18 | 2.1 | 0.125 | 0.65 (min flow) |
| 30.5 | 24.5 | 0.42 | 4.8 | 0.125 | 1.151 |
| 36.75 | 50 | 0.7 | 8 | 0.125 | 2.52 |

Column Diameter - 4 in;

column area - 0.0873 ft²;

Water disperser - Water Remediation Technology bubble cap, even gap.

Column maintained in a true vertical position and water dispersed through bubble cap with even gap around the circumference. The water flow around the bubble cap appeared more random and the upflow channeling at the base of the zeolite bed moved at random. Minimum flow was at 25% expansion.

TABLE 14

Fluidization Test For 40 × 70 mesh, comp. from Rotab Fractions

| Bed Height (inches) | Expansion % | Flow Rate GPM | Flow Rate GPM/ft₂ | Cap Gap (Inches) | Average Flow Velocity Under Cap ft/sec |
|---|---|---|---|---|---|
| 24.5 | 0 | 0 | 0 | 0.125 | 0 |
| 25.0 | 2 | 0.11 | 1.3 | 0.125 | 0.40 (min flow) |
| 30.5 | 24.5 | 0.29 | 3.3 | 0.125 | 1.05 |
| 36.75 | 50 | 0.42 | 4.8 | 0.125 | 1.51 |

Column Diameter - 4 in;

column area - 0.0873 ft²;

Water disperser - Water Remediation Technology bubble cap, even gap.

Column was maintained in a true vertical position and the water dispersed through the bubble cap with even gap around the circumference. The water flow around the bubble cap appeared more random and the upflow channel at the base of the zeolite bed moved at random.

TABLE 15

Fluidization Test For 30 × 70 mesh, comp. from Rotab Fractions

| Bed Height (inches) | Expansion % | Flow Rate GPM | Flow Rate GPM/ft² | Cap Gap (Inches) | Average Flow Velocity Under Cap ft/sec |
|---|---|---|---|---|---|
| 23.5 | 0 | 0 | 0 | 0.125 | 0 |
| 25.5 | 8.5 | 0.11 | 1.3 | 0.125 | 0.4 (min flow) |
| 29.25 | 24.5 | 0.36 | 4.1 | 0.125 | 1.30 |
| 35.25 | 50 | 0.53 | 6.1 | 0.125 | 1.91 |

Column Diameter - 4 in;

column area - 0.0873 ft²;

Water disperser - Water Remediation Technology bubble cap, even gap.

Column maintained in a true vertical position and water dispersed through bubble cap with even gap around the circumference. The water flow around the bubble cap appeared random and the upflow channeling at the base of the zeolite bed moved at random

TABLE 16

Fluidization Test For 40 × 70 mesh, pilot plant product

| Bed Height | | Flow Rate | | Cap Gap | Average Flow Velocity Under Cap |
|---|---|---|---|---|---|
| (inches) | Expansion % | GPM | GPM/ft$^2$ | (inches) | ft/sec |
| 24.25 | 0 | 0 | 0 | 0.125 | 0 |
| 25.5 | 5.2 | 0.08 | 0.9 | 0.125 | 0.29 |
| 30.3 | 24.9 | 0.2 | 2.3 | 0.125 | 0.72 |
| 36.38 | 50 | 0.38 | 4.4 | 0.125 | 1.37 |

Column Diameter - 4 in;
column area - 0.0873 ft$^2$;
Water disperser - Water Remediation Technology bubble cap, even gap.
Column maintained in a true vertical position and water dispersed through bubble cap with even gap around the circumference. The water flow around the bubble cap appeared random and the upflow channeling at the base of the zeolite bed moved at random.

Data from these Figures and Tables provided that a 50×70 mesh composite product having a bed expansion of 50% under 4.4 gpm/ft2 of water worked well.

In conclusion, the 60×70 mesh and 50×70 mesh composite appear to be the size zeolite particles that meet the bed expansion and hydraulic loading criteria of the present invention. It is worth noting that the finer particle curves show that finer material is extremely sensitive to flow rate. A small increase or decrease in flow will result in a substantial bed-height change.

Example 2

Up-Flow 20×50 Mesh Zeolite Performs Well in Radium Removal from an Aqueous Source Two Radium removal tests were independently performed using 20×50 mesh size composite zeolite, under up-flow conditions, using the relationships described in FIG. 4. Four 48 inch high columns having 4 inch diameters were connected in series, each column having approximately 10 pounds of 20×50 mesh zeolite per column. A series of pumps moves the source aqueous medium in an up-flow direction to "fluidize" the bed of each column (to a bed expansion within the 25 to 50% range).

Minimum bed expansion was attained with 0.23 cu ft of source flowing into each column. Referring to Tables 17 and 18, it is noted that radium levels were vastly diminished from each of the two sources: for the first source, 98,961 gallons of medium (Table 17) and for the second source, at least 59,531 gallons (Table 18). This data provides strong evidence that the present invention is useful for removing/reducing the levels of contaminates under high flow through situations.

TABLE 17

Elbum, Illinois Pilot Plant Study

| Ra-226 | | | | Concentration (pCi/L) | | | | |
|---|---|---|---|---|---|---|---|---|
| Date | Totalizer | Flow | MCL | Feed | C1 | C2 | C3 | C4 |
| 4/22 | 0 | 0 | 5 | 12.1 | — | — | — | — |
| 4/24 | 2210 | 0.767 | 5 | 12.7 | 0.5 | 0.12 | 0.05 | 0.09 |
| 4/26 | 4688 | 0.860 | 5 | 14.1 | 0.42 | | | 0.31 |
| 4/30 | 8661 | 0.690 | 5 | 11.2 | 0.23 | 0.18 | 0.18 | 0.07 |
| 5/7 | 17108 | 0.838 | 5 | 20.1 | 2.19 | 0.36 | 0.1 | 0.12 |
| 5/16 | 27394 | 0.794 | 5 | 10.4 | 7.33 | 0.97 | 0.16 | 0.49 |
| 5/19 | 30699 | 0.765 | 5 | 13.8 | 5.66 | 0.82 | 0.15 | 0.12 |
| 6/9 | — | — | 5 | 2.03 | 7.29 | 2.46 | 0.27 | 0.08 |
| 7/10 | 76892 | — | 5 | 7.39 | 5.69 | 3.51 | 0.71 | 0.28 |
| 7/27 | 98961 | — | 5 | 13 | 10.4 | 5.7 | 2.84 | 1.56 |
| 8/19 | 103193 | 0.128 | 5 | 9.68 | 8.81 | 5.32 | 3.99 | 1.89 |
| 9/17 | — | — | 5 | 12.3 | 10.4 | 7.87 | 4.92 | 3.67 |

TABLE 17-continued

Elbum, Illinois Pilot Plant Study

| Ra-228 | | | | Concentration (pCi/L) | | | | |
|---|---|---|---|---|---|---|---|---|
| Date | Totalizer | Flow | MCL | Feed | C1 | C2 | C3 | C4 |
| 4/22 | 0 | — | 5 | 6.04 | — | — | — | — |
| 4/24 | 2210 | 0.767 | 5 | 8.62 | 0.51 | 0.33 | 0.6 | 0.18 |
| 4/26 | 4688 | 0.860 | 5 | 8.09 | 0.27 | — | 0.33 | 0.14 |
| 4/30 | 8661 | 0.690 | 5 | 6.68 | 0.98 | 0.21 | 0.22 | — |
| 5/7 | 17108 | 0.838 | 5 | 6.99 | 1.96 | 0.55 | 0.3 | 0.05 |
| 5/16 | 27394 | 0.794 | 5 | 3.89 | 1.68 | 0.4 | 0.27 | 0.33 |
| 5/19 | 30699 | 0.765 | 5 | 4.37 | 0.76 | 0.52 | 0.45 | 0.87 |
| 6/9 | — | — | 5 | 3.29 | 2.12 | 0.56 | 0.19 | 0.19 |
| 7/10 | 76892 | — | 5 | 13.5 | 10.2 | 4.49 | 2.14 | 0.96 |
| 7/27 | 98961 | — | 5 | 10.8 | 4.81 | 4.04 | 2.02 | 1.45 |
| 8/19 | 103193 | 0.128 | 5 | 7.29 | 7.25 | 4.01 | 4.75 | 5.54 |
| 9/17 | — | — | 5 | 8.75 | 10.1 | 10.4 | 5.57 | 3.99 |

| Ra Combined | | | | Concentration (pCi/L) | | | | |
|---|---|---|---|---|---|---|---|---|
| Date | Totalizer | Flow | MCL | Feed | C1 | C2 | C3 | C4 |
| 4/22 | 0 | — | 5 | 18.14 | — | — | — | — |
| 4/24 | 2210 | 0.767 | 5 | 21.32 | 1.01 | 0.45 | 0.65 | 0.27 |
| 4/26 | 4688 | 0.860 | 5 | 22.19 | 0.69 | 0 | 0.33 | 0.45 |
| 4/30 | 8661 | 0.690 | 5 | 17.88 | 1.21 | 0.39 | 0.4 | 0.07 |
| 5/7 | 17108 | 0.838 | 5 | 27.09 | 4.15 | 0.91 | 0.4 | 0.17 |
| 5/16 | 27394 | 0.794 | 5 | 14.29 | 9.01 | 1.37 | 0.43 | 0.82 |
| 5/19 | 30699 | 0.765 | 5 | 18.17 | 6.42 | 1.34 | 0.6 | 0.99 |
| 6/9 | — | — | 5 | 5.32 | 9.41 | 3.02 | 0.46 | 0.27 |
| 7/10 | 76892 | — | 5 | 20.89 | 15.89 | 8 | 2.85 | 1.24 |
| 7/27 | 98961 | — | 5 | 23.8 | 15.21 | 9.74 | 4.86 | 3.01 |
| 8/19 | 103193 | 0.128 | 5 | 16.97 | 16.06 | 9.33 | 8.74 | 7.43 |
| 9/17 | — | — | 5 | 21.05 | 20.5 | 18.2 | 10.49 | 7.66 |

| Ra Combined | | | | Cumulative Loading (pCi/g) | | | |
|---|---|---|---|---|---|---|---|
| Date | Totalizer | Flow | MCL | C1 | C2 | C3 | C4 |
| 4/22 | 0 | — | 5 | 37.37 | | | |
| 4/24 | 2210 | 0.767 | 5 | 81.73 | | | |
| 4/26 | 4688 | 0.860 | 5 | 136.87 | | | |
| 4/30 | 8661 | 0.690 | 5 | 298.21 | | | |
| 5/7 | 17108 | 0.838 | 5 | 343.43 | 22.79 | 3.59 | 1.62 |
| 5/16 | 27394 | 0.794 | 5 | 375.76 | 88.22 | 11.64 | |
| 5/19 | 30699 | 0.765 | 5 | | 102.2 | 13.67 | |
| 6/9 | — | — | 5 | | | | |
| 7/10 | 76892 | — | 5 | | | | |
| 7/27 | 98961 | — | 5 | | | | |
| 8/19 | 103193 | 0.128 | 5 | 3.21 | 23.71 | 2.08 | 4.62 |
| 9/17 | — | — | 5 | −44.05 | −167.88 | −666.37 | −238.53 |

| Ra Combined | | | | Recovery (%) | | | | |
|---|---|---|---|---|---|---|---|---|
| Date | Totalizer | Flow | MCL | Total | C1 | C2 | C3 | C4 |
| 4/22 | 0 | — | 5 | 98.7 | 95.3 | 55.4 | | 58.5 |
| 4/24 | 2210 | 0.767 | 5 | 98 | 96.9 | | | |
| 4/26 | 4688 | 0.860 | 5 | 99.6 | 93.2 | 67.8 | | 82.5 |
| 4/30 | 8661 | 0.690 | 5 | 99.4 | 84.7 | 78.1 | 56 | 57.5 |
| 5/7 | 17108 | 0.838 | 5 | 94.3 | 36.9 | 84.8 | 68.6 | |
| 5/16 | 27394 | 0.794 | 5 | 94.6 | 64.7 | 79.1 | 55.2 | |
| 5/19 | 30699 | 0.765 | 5 | | | | | |
| 6/9 | — | — | 5 | | | | | |
| 7/10 | 76892 | — | 5 | | | | | |
| 7/27 | 98961 | — | 5 | | | | | |
| 8/19 | 103193 | 0.128 | 5 | 56.2 | 5.4 | 41.9 | 6.3 | 15 |
| 9/17 | — | — | 5 | 63.6 | 2.6 | 10.9 | 42.6 | 27 |

TABLE 18

Reddick, Illinois Pilot Plant Study

| Date | Total | Flow | MCL | Feed | C1 | C2 |
|---|---|---|---|---|---|---|
| Ra-226 | | | | Concentration (pCi/L) | | |
| 5/20 | 0 | | 5 | | | |
| 5/27 | 5855 | 0.581 | 5 | 2.98 | 0.02 | 0.06 |
| 6/2 | 10704 | 0.561 | 5 | 3.7 | 0.15 | 0.04 |
| 6/9 | 17007 | 0.625 | 5 | 1.36 | 2.35 | 0.10 |
| 6/12 | 21150 | 0.959 | 5 | 7.44 | 0.83 | 0.54 |
| 6/16 | 26768 | 0.975 | 5 | 16.40 | 2.11 | 1.09 |
| 6/19 | 30942 | 0.966 | 5 | 4.53 | 0.59 | 0.09 |
| 7/10 | 46889 | 0.527 | 5 | 2.96 | 0.54 | 0.09 |
| 8/14 | 59531 | 0.251 | 5 | 4.32 | 1.00 | 0.11 |
| 9/9 | | −1.590 | 5 | 4.09 | 1.02 | 0.61 |
| 9/27 | | | 5 | 3.22 | 1.56 | 0.83 |
| Ra-228 | | | | Concentration (pCi/L) | | |
| 5/20 | 0 | | 5 | | | |
| 5/27 | 5855 | 0.581 | 5 | 2.88 | 0.33 | 0.41 |
| 6/2 | 10704 | 0.561 | 5 | 3.00 | 0.13 | 0.44 |
| 6/9 | 17007 | 0.625 | 5 | 1.04 | 0.45 | 0.08 |
| 6/12 | 21150 | 0.959 | 5 | 1.46 | 0.21 | 0.23 |
| 6/16 | 26768 | 0.975 | 5 | 5.07 | 0.42 | 0.29 |
| 6/19 | 30942 | 0.966 | 5 | 4.79 | 0.07 | 0.53 |
| 7/10 | 46889 | 0.527 | 5 | 5.68 | 1.77 | 1.36 |
| 8/14 | 59531 | 0.251 | 5 | 3.38 | 1.57 | 0.47 |
| 9/9 | | −1.590 | 5 | 3.80 | 3.57 | 81 |
| 9/27 | | | 5 | 3.86 | 3.18 | 2.64 |
| Ra Combined | | | | Concentration (pCi/L) | | |
| 5/20 | 0 | | 5 | | | |
| 5/27 | 5855 | 0.581 | 5 | 5.86 | .35 | .47 |
| 6/2 | 10704 | 0.561 | 5 | 6.71 | .28 | .48 |
| 6/9 | 17007 | 0.625 | 5 | 2.40 | 2.80 | .18 |
| 6/12 | 21150 | 0.959 | 5 | 8.90 | 1.04 | .77 |
| 6/16 | 26768 | 0.975 | 5 | 21.47 | 2.53 | 1.38 |
| 6/19 | 30942 | 0.966 | 5 | 9.32 | .66 | .62 |
| 7/10 | 46889 | 0.527 | 5 | 8.64 | 2.31 | 1.45 |
| 8/14 | 59531 | 0.251 | 5 | 7.70 | 2.57 | .58 |
| 9/9 | | −1.590 | 5 | 7.89 | 4.59 | 1.42 |
| 9/27 | | | 5 | 7.08 | 4.74 | 3.47 |
| Ra Combined | | | | Cumulative Loading (pCi/G) | | |
| 5/20 | 0 | | 5 | | | |
| 5/27 | 5855 | 0.581 | 5 | | 26.86 | |
| 6/2 | 10704 | 0.561 | 5 | | 52.82 | |
| 6/9 | 17007 | 0.625 | 5 | | 50.72 | 13.75 |
| 6/12 | 21150 | 0.959 | 5 | | 77.83 | 14.68 |
| 6/16 | 26768 | 0.975 | 5 | | 166.43 | 20.06 |
| 6/19 | 30942 | 0.966 | 5 | | 196.52 | 20.20 |
| 7/10 | 46889 | 0.527 | 5 | | 280.57 | 31.62 |
| 8/14 | 59531 | 0.251 | 5 | | 334.57 | 52.56 |
| 9/9 | | −1.590 | 5 | | 171.00 | −104.56 |
| 9/27 | | | 5 | | 171.00 | −104.56 |
| Ra Combined | | | | Recovery (%) | | |
| 5/20 | 0 | | 5 | | | |
| 5/27 | 5855 | 0.581 | 5 | 92.0 | 94.0 | −34.3 |
| 6/2 | 10704 | 0.561 | 5 | 92.8 | 95.8 | −71.4 |
| 6/9 | 17007 | 0.625 | 5 | 92.5 | −16.7 | 93.6 |
| 6/12 | 21150 | 0.959 | 5 | 91.3 | 88.3 | 26.0 |
| 6/16 | 26768 | 0.975 | 5 | 93.6 | 88.2 | 45.5 |
| 6/19 | 30942 | 0.966 | 5 | 93.3 | 92.9 | 6.1 |
| 7/10 | 46889 | 0.527 | 5 | 83.2 | 73.3 | 37.2 |
| 8/14 | 59531 | 0.251 | 5 | 92.5 | 66.6 | 77.4 |
| 9/9 | | −1.590 | 5 | 82.0 | 41.8 | 69.1 |
| 9/27 | | | 5 | 51.0 | 33.3 | 26.8 |

Example 3

Up-Flow 20×40 Mesh Zeolite Resulted in Lower Levels of Red Cloud than Up-Flow Through 12×40 Mesh Zeolite Aqueous media from the same source was passed through either a 12×40 mesh zeolite or a 20×40 mesh zeolite at varying flow-rates. Discharge media was observed for particulates, and in particular for "red cloud" formation. The smaller sized zeolite, 20×40, showed greater bed expansion at each flow rate and also more mixing at each flow rate. Several independent observations concluded that the medium that flowed over the 20×40 zeolite mesh had less red cloud formation than the medium that flowed over the 12×40 zeolite mesh. It appears that the increased bed expansion and mixing (scouring) reduced the levels of iron on the 20×40 mesh to reduce the formation of the "red cloud."

It will be clear that the invention is well adapted to attain the ends and advantages mentioned as well as those inherent therein. While a presently preferred embodiment has been described for purposes of disclosure, various changes and modifications may be made which will readily suggest themselves to those skilled in the art and which are encompassed in the spirit of the invention disclosed herein and as defined in the appended claims.

What is claimed is:

1. A method for removing a contaminate from an aqueous medium, the aqueous medium having a first concentration of contaminate, the method comprising:
   determining a target hydraulic loading for the aqueous medium based on an anticipated contact time of the aqueous medium with a zeolite material;
   determining the mesh size and size distribution of the zeolite material from the determined hydraulic loading that will provide 7.3% to about 50% expansion of the zeolite bed volume when the aqueous medium is contacted with the bed volume in an up-flow direction;
   providing the determined mesh size and size distribution of zeolite to the appropriate bed volume in a device for performing the up-flow contact; and
   contacting the aqueous medium with the zeolite material at the target hydraulic loading wherein the contacting removes the contaminate from the aqueous medium from the first concentration to a lower second concentration.

2. The method of claim 1 wherein the hydraulic loading for the aqueous medium is from about 3 gallons per minute/ft$^2$ to about 25 gallons per minute/ft$^2$.

3. The method of claim 1 wherein the hydraulic loading for the aqueous medium is from about 4 gallons per minute/ft$^2$ to about 6 gallons per minute/ft$^2$.

4. The method of claim 2 wherein the determined mesh size is about 60×70.

5. The method of claim 2 wherein the determined mesh size is a composite mesh of 50×80.

6. The method of claim 2 wherein the determined mesh size is a composite mesh of 20×30.

7. A system comprising:
   at least one column comprising zeolite having a pre-determined mesh size;
   wherein the at least one column is adapted to receive, in an up-flow direction, an aqueous medium at a hydraulic flow such that 7.3% to about 50% of the zeolite is expanded.

8. The system of claim 7 wherein the predetermined mesh size is 20×30.

9. The system of claim 7 wherein the predetermined mesh size is 40×70.

10. The system of claim 7 wherein the predetermined mesh size is 50×80.

11. The system of claim 7 wherein the predetermined mesh size is 60×70.

12. The system of claim 7 further comprising a second column comprising zeolite having a predetermined mesh size wherein the second column receives the aqueous medium from the first column in an up-flow direction at a hydraulic flow such that 7.3% to about 50% of the zeolite in the second column is expanded.

13. The system of claim 7 wherein the aqueous medium is loaded into the at least first column at 4 to 6 gallons per minute/ft$^2$.

14. A column adapted for receiving hydraulic loading of an aqueous medium of from between 3 and 25 gallons per minute/ft$^2$ and a bed volume of zeolite with a predetermined mesh size, which upon application of the hydraulic loading in an up-flow direction results in 7.3% to 50% expansion of the zeolite bed volume.

15. The column of claim 14 wherein the zeolite mesh size is an composite of 20×30.

16. The column of claim 14 wherein the zeolite mesh size is an composite of 40×70.

17. The column of claim 14 wherein the hydraulic loading is from about 4 to about 6 gallons per minute/ft$^2$.

18. The column of claim 14 wherein the zeolite mesh size is a fine mesh size of 60×70.

19. The column of claim 14 wherein the zeolite mesh size is a fine mesh size of 50×80.

20. The column of claim 14 further comprising a filter at one end of the column to prevent the zeolite from exiting the column when receiving the aqueous medium.

\* \* \* \* \*